US012458876B2

(12) United States Patent
Colenbrander

(10) Patent No.: US 12,458,876 B2
(45) Date of Patent: *Nov. 4, 2025

(54) HIGH-SPEED SAVE DATA STORAGE FOR CLOUD GAMING

(71) Applicant: Sony Interactive Entertainment LLC, San Mateo, CA (US)

(72) Inventor: Roelof Roderick Colenbrander, Costa Mesa, CA (US)

(73) Assignee: Sony Interactive Entertainment LLC

( * ) Notice: Subject to any disclaimer, the term of this patent is extended or adjusted under 35 U.S.C. 154(b) by 314 days.

This patent is subject to a terminal disclaimer.

(21) Appl. No.: 18/298,570

(22) Filed: Apr. 11, 2023

(65) Prior Publication Data

US 2023/0241494 A1 Aug. 3, 2023

Related U.S. Application Data

(63) Continuation of application No. 17/107,329, filed on Nov. 30, 2020, now Pat. No. 11,623,140.

(60) Provisional application No. 63/047,183, filed on Jul. 1, 2020.

(51) Int. Cl.
| | | |
|---|---|---|
| A63F 13/355 | (2014.01) | |
| A63F 13/20 | (2014.01) | |
| A63F 13/77 | (2014.01) | |
| G06F 9/54 | (2006.01) | |

(52) U.S. Cl.
CPC ............ *A63F 13/355* (2014.09); *A63F 13/20* (2014.09); *A63F 13/77* (2014.09); *G06F 9/547* (2013.01)

(58) Field of Classification Search
CPC ........ A63F 13/355; A63F 13/20; A63F 13/77; G06F 9/547
See application file for complete search history.

(56) References Cited

U.S. PATENT DOCUMENTS

| | | | |
|---|---|---|---|
| 2016/0014603 A1 | 1/2016 | Woodward et al. | |
| 2019/0104199 A1* | 4/2019 | Rothman | ............ H04L 43/0805 |
| 2019/0251055 A1* | 8/2019 | Chen | ..................... G06F 1/3228 |

(Continued)

FOREIGN PATENT DOCUMENTS

| | | |
|---|---|---|
| CN | 104639325 A | 5/2015 |
| CN | 106621326 A | 5/2017 |
| CN | 109152955 A | 1/2019 |

(Continued)

*Primary Examiner* — Yingchuan Zhang
(74) *Attorney, Agent, or Firm* — Kilpatrick Townsend & Stockton LLP

(57) ABSTRACT

A video game is executed on a cloud gaming server for play by a user. User data for the user is stored in a cloud storage server. A data access request issued by the video game is received by a management server. The data access request identifies requested user data stored in the cloud storage server. The requested user data is copied from a lower performance data storage device within the cloud storage server into a high-speed data storage device within the management server. The high-speed data storage device operates at a higher data rate and a lower latency than the data storage device within the cloud storage server. The high-speed data storage device in the management server is used to fulfill the data access request by the video game instead of using the lower performance data storage device in the cloud storage server to fulfill the data access request.

20 Claims, 4 Drawing Sheets

(56) References Cited

U.S. PATENT DOCUMENTS

2020/0204862 A1* 6/2020 Miller ................ H04N 21/4668

FOREIGN PATENT DOCUMENTS

| JP | 6154527 B1 | 6/2017 |
| JP | 2018526735 A | 9/2018 |
| JP | 2019527079 A | 9/2019 |
| WO | 2016014603 A1 | 1/2016 |

* cited by examiner

HIGH-SPEED SAVE DATA STORAGE FOR CLOUD GAMING

CROSS-REFERENCE TO RELATED APPLICATIONS

This application is a continuation application under 35 U.S.C. 120 of prior U.S. application Ser. No. 17/107,329, filed Nov. 30, 2020, issued as U.S. Pat. No. 11,623,140, on Apr. 11, 2023, which claims priority under 35 U.S.C. 119(e) to U.S. Provisional Patent Application No. 63/047,183, filed on Jul. 1, 2020. The disclosure of each above-identified application is incorporated herein by reference in its entirety for all purposes.

BACKGROUND OF THE INVENTION

The video game industry has seen many changes over the years. As computing power has expanded, developers of video games have likewise created game software that takes advantage of the growing computing power. To this end, video game developers have been coding games that incorporate sophisticated operations and mathematics to produce a very realistic game experience.

In addition to accommodating for the expanding computing power, the game developers are also developing online games that increase the interaction between user and the gaming system. The interactive online games provide the ability for a user to interactively play against or with other users over the Internet and capture such interactions. Additionally, with the growing trend in cloud-based computing, the game developers are developing new ways for playing existing legacy games and for developing new games by taking advantage of the increased computing power and increased user interactivity. The cloud-based computing systems may include a cloud-based processing server that executes a game application, and communicates with a remote client system that is present at a location of a game player, where the remote client system can be configured to receive input from the game player and render video on a display for viewing by the game player. It is within this context that the present invention arises.

SUMMARY OF THE INVENTION

In an example embodiment, a cloud gaming system is disclosed. The cloud gaming system includes a cloud gaming server configured to execute a video game in accordance with inputs received from a controller device of a user. The cloud gaming server is configured to direct transmission of a video stream reflecting play of the video game by the user to a local computing system of the user. The cloud gaming system also includes a cloud storage server. The cloud storage server includes a data storage device for storing user data for the user. The user data includes data that memorializes the play of the video game by the user. The cloud gaming system also includes a management server in data communication with both the cloud gaming server and the cloud storage server. The management server includes a high-speed data storage device that operates at a higher data rate and a lower latency than the data storage device within the cloud storage server. The management server is programmed to receive a data access request issued by the video game executing on the cloud gaming server. The data access request identifies requested data stored in the data storage device within the cloud storage server. The management server is programmed to copy the requested data from the data storage device within the cloud storage server into the high-speed data storage device. The management server is programmed to respond to the data access request using the high-speed data storage device instead of having the cloud storage server respond to the data access request.

In an example embodiment, a method is disclosed for operating a cloud gaming system. The method includes executing a video game on a cloud gaming server in accordance with inputs received from a controller device of a user. The method also includes operating the cloud gaming server to direct transmission of a video stream reflecting play of the video game by the user to a local computing system of the user. The method also includes having user data for the user stored in a cloud storage server. The user data includes data that memorializes the play of the video game by the user. The method also includes receiving a data access request at a management server. The data access request is issued by the video game executing on the cloud gaming server. The data access request identifies requested data stored in a data storage device within the cloud storage server. The method also includes copying the requested data from the data storage device within the cloud storage server into a high-speed data storage device within the management server. The high-speed data storage device operates at a higher data rate and a lower latency than the data storage device within the cloud storage server. The method also includes using the high-speed data storage device in the management server to respond to the data access request instead of having the cloud storage server respond to the data access request.

DETAILED DESCRIPTION OF THE INVENTION

In the following description, numerous specific details are set forth in order to provide a thorough understanding of the present disclosure. It will be apparent, however, to one skilled in the art that embodiments of the present disclosure may be practiced without some or all of these specific details. In other instances, well known process operations have not been described in detail in order not to unnecessarily obscure the present disclosure.

The next generation of video game consoles has a very fast data storage solution, such as NVMe (Non-Volatile Memory Express) SSDs (Solid State Drives), that is much faster than the currently available data storage solution, such as HDDs (Hard Disk Drives). The very fast data storage solution of the next generation video game console poses a challenge for cloud gaming, which relies on shared storage servers for storing game data as well as user data, such as for saving games. In conventional cloud gaming systems, user data is typically stored in a cloud storage solution, such as in a cloud storage server, which operates at HDD-level data storage performance in order keep costs down. However, with the next generation of video game console, at least NVMe-level data storage performance is needed to meet the data access expectations of game console titles (video games).

Systems and methods are disclosed herein to meet the challenge of providing NVMe-level data storage performance for online video game execution, while also continuing to use the cost-effective HDD technology for storing user data associated with online video game play. It should be understood that the term online video game as used herein refers to a video game that is served by a cloud computing system to a client computing device for play by a user on the client computing device. The online video game as referred to herein can be a single player video game or a multi-player video game. A principle of the systems and methods disclosed herein is to provide close data communication between a cloud gaming server executing an online video game and a cloud data storage solution in which data currently needed by the executing online video game is stored in a fast data storage device/system within a management server, while save data and other game-related data that is not urgently needed by the executing online video game is stored in the slower more cost-effective cloud storage server.

Figure 1:
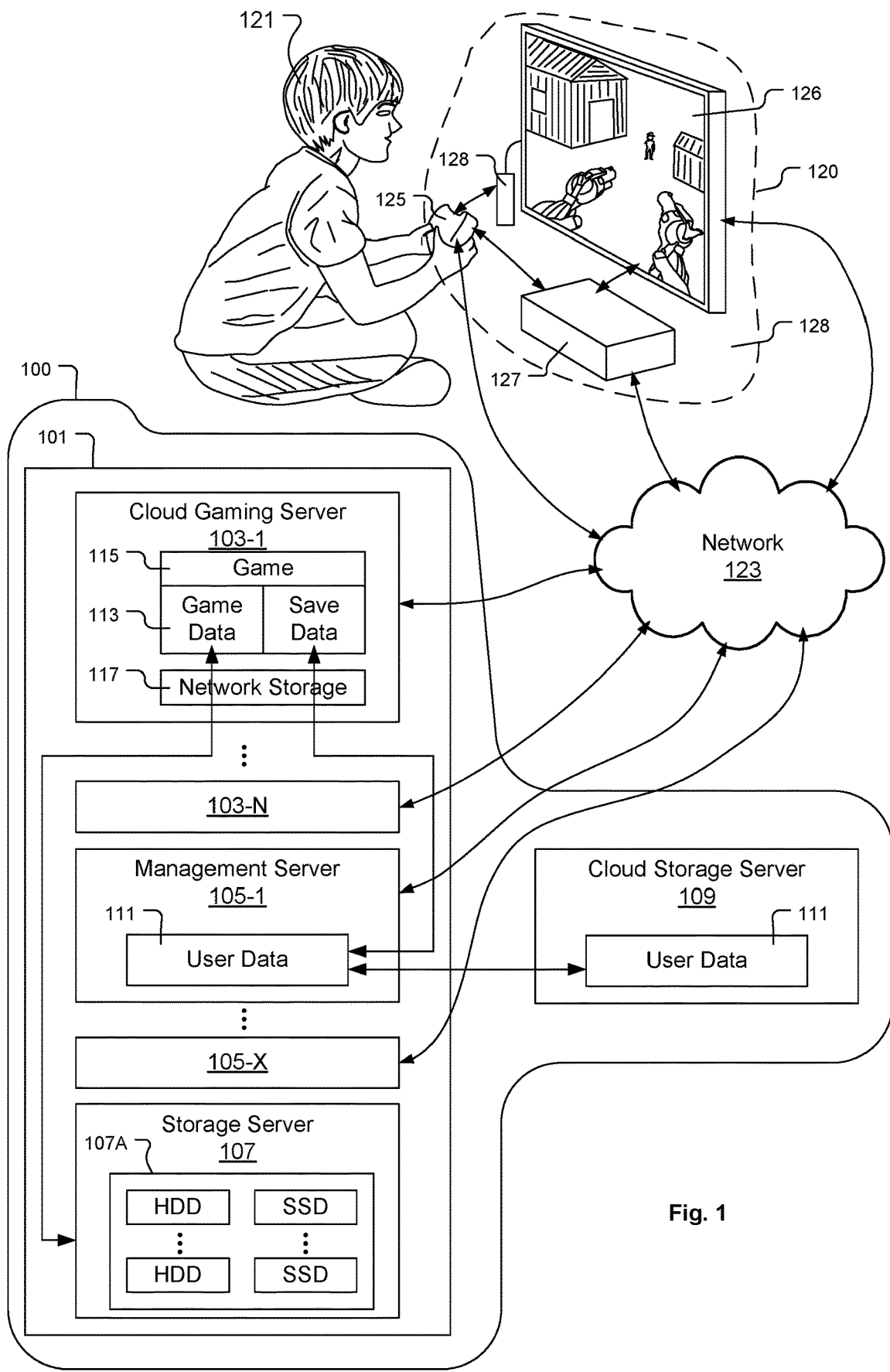
FIG. 1 shows a cloud gaming system, in accordance with some embodiments.

FIG. 1 shows a cloud gaming system 100, in accordance with some embodiments. The cloud gaming system 100 includes a cloud gaming server rack 101 that includes a number (N) of cloud gaming servers 103-1 to 103-N. In some embodiments, the number (N) of cloud gaming servers 103-1 to 103-N can be up to 100, or even more. The cloud gaming server rack 101 also includes a number (X) of management servers 105-1 to 105-X and one or more storage server(s) 107. The storage server 107 includes a large number of data storage devices 107A, such as HDDs and/or SSDs. The storage server 107 stores all of the video games that are available for play on the cloud gaming system 100. Each management server 105-1 to 105-X is responsible for managing a cloud gaming session. Also, a given management server 105-1 to 105-X can be responsible for simultaneously managing multiple cloud gaming sessions. In some embodiments, each management server 105-1 to 105-X operates to power on one or more cloud gaming servers 103-1 to 103-N when needed, load a requested video game from the storage server 107 to a given one of the cloud gaming servers 103-1 to 103-N, start execution of the requested video game on the given one of the cloud gaming servers 103-1 to 103-N, log users into the given one of the cloud gaming servers 103-1 to 103-N, and mount user data 111 for the logged in users from a cloud storage server 109, among other operations.

In some embodiments, the storage server 107 can be replaced by a storage configuration in which HDD's and/or SSD's are turned into mini-servers by equipping them with a network interface card (NIC) and a small central processing unit (CPU). An example of such a storage configuration is an embedded SSD (ESSD). For example, in some ESSD's a memory controller integrated circuit (IC) chip is combined with an SSD in a single package using a ball grid array (BGA) format in a flip-chip packaging process. In some embodiments, the single package including the IC chip and the SSD can be directly mounted to a printed circuit board (motherboard), without using a module connector. Of course, it should be understood that there are many possible configurations of ESSD's that can be substituted for the storage server 107 in various embodiments. One motivation for use of ESSD's in place of the storage server 107 is that traditional storage servers are no longer scaling well due to storage data communication getting faster than networking data communication. In some embodiments, when an ESSD storage configuration is used in place of the storage server 107, a game can be striped across multiple ESSD's. In these embodiments, the cloud gaming server 103-1 to 103-N will need to reach out to different drives (different ESSD's) for different parts of the game. Also, in some embodiments, the use of ESSD's can be extended to the cloud storage server 109. In such embodiments, it will be necessary to have clusters of many ESSD's, with the management server 105-1 to 105-X functioning to hide the ESSD-based cloud storage server 109 implementation details from the cloud gaming servers 103-1 to 103-N.

In cloud gaming (or online gaming), a user (game player) 121 operates a local computing system 120 to log into the cloud gaming system 100 over a network 123, such as the Internet, and play an online video game that is executed remotely on one or more of the cloud gaming servers 103-1 to 103-N. In some embodiments, the user 121 logs into the cloud gaming system 100 through one of the management servers 105-1 to 105-X. It should be understood, however, that there are various cloud services involved in logging in the user 121. For example, there are cloud services involved for authenticating the user 121, for ensuring that the user 121 has an internet connection of sufficient quality, and for finding an available server near to the user 121 into which the user 121 can log in. In some embodiments, the local computing system 120 includes a game controller 125 and a display device 126, such as a television or monitor. In some embodiments, the local computing system 120 includes a dongle 128 connected to the display device 126, where the dongle 128 is configured to enable data communication between the game controller 125 and the display device 126, such that a network interface controller (NIC) of the display device 126 can be used to transmit signals from the game controller 125 to the network 123. In some embodiments, the local computing system 120 also includes a local game console 127. In these embodiments, signals generated by the game controller 125 can be transmitted through the local game console 127 to the network 123 using a NIC of the local game console 127. Also, in some embodiments, the game controller 125 can communicate signals directly to the network 123 through a local area network, such as a WIFI network. Also, in some embodiments, the user 121 can play the online video game on a local computing device other than the local computing system 120. For example, in some embodiments, the user 121 can play the online video game on a mobile computing device, such a cell phone, tablet, laptop, smart car system, among others. Also, in some embodiments, the user 121 can play the online video game on a desktop computing system. For ease of description, reference to the local computing system 120 herein also conveys reference to any other computing device on which the user 121 can play the online video game.

Additionally, in various embodiments, data (such as video stream data or audio data or haptic feedback data) is communicated from the cloud gaming system 100 through the network 123 to the local computing system 120. In some embodiments, data is communicated from the cloud gaming system 100 through the network 123 to the display device 126. In some embodiments, data is communicated from the cloud gaming system 100 through the network 123 to the local game console 127, and from the local game console 127 to the display device 126. Also, in some embodiments, data is communicated from the cloud gaming system 100 through the network 123 to the game controller 125.

During game play, the user 121 generates game commands that are transmitted through the network 123 to the cloud gaming server 103-1 to 103-N. In some embodiments, the user 121 uses the game controller 125 to generate the game commands, which are transmitted in signal form from the game controller 125 to the network 123 and on to the cloud gaming server 103-1 to 103-N. In some embodiments, the game commands are transmitted in signal form from the game controller 125 to the local game console 127 or to the display device 126, from which the game commands are transmitted through the network 123 to the cloud gaming server 103-1 to 103-N. In various embodiments, the transmission of game commands in signal form from the game controller 125 to the network 123 can be done over a wired network connection or a wireless network connection, or a combination thereof. The cloud gaming server 103-1 to 103-N executes the video game in accordance with the game commands received from the user 121 to generate a video stream reflecting the user's play of the video game. The video stream is transmitted from the cloud gaming server 103-1 to 103-N through the network 123 to the local computing system 120 of the user 121 for display on the display device 126.

The cloud gaming server 103-1 to 103-N loads all of the game data 113 and game executables 115 from the storage server 107 using a network storage protocol 117. In some embodiments, the network storage protocol 117 utilizes block storage, such as iSCSI (Internal Small Computer Systems Interface), among others. In some embodiments, the network storage protocol utilizes file storage, such as NFS (Network File System) or CIFS (Common Internet File System), among others. In some embodiments, the cloud gaming server 103-1 to 103-N may be limited in supported network storage protocols 117. For example, in some embodiments, because of lack of a software driver, the cloud gaming server 103-1 to 103-N may be limited in supported network storage protocols 117. Or, in some embodiments, because some network storage protocols use too much resources, such as CPU usage and/or memory usage, the cloud gaming server 103-1 to 103-N may be limited in supported network storage protocols 117. In some embodiments, because the cloud gaming server 103-1 to 103-N may be limited in supported network storage protocols 117, access by the cloud gaming server 103-1 to 103-N to user data 111 may done through the management server 105-1 to 105-X, with the management server 105-1 to 105-X acting as a proxy. In these embodiments, the management server 105-1 to 105-X mounts user data 111 from the cloud storage server 109 and exposes the user data 111 to the cloud gaming server 103-1 to 103-N using a data storage protocol that is supported by the cloud gaming server 103-1 to 103-N.

In various embodiments, the cloud storage server 109 exposes data storage by various data storage protocols, such as by object storage, or file storage, or block storage, or other data storage protocol. The management server 105-1 to 105-X is equipped to interface with whatever data storage protocol is used by the cloud storage server 109, whether it be object storage, file storage, or block storage, or other data storage protocol. The management server 105-1 to 105-X is also configured to expose its own data storage by various data storage protocols, such as object storage, file storage, or block storage, or other data storage protocol. And, the data storage protocol by which the management server 105-1 to 105-X exposes its own data storage can be either the same as or different from the data storage protocol by which the cloud storage server 109 exposes its own data storage. For example, in some embodiments, the management server 105-1 to 105-X is programmed to mount an object storage from the cloud storage system 109 as a file system, and in turn present the mounted file system to the cloud gaming server 103-1 to 103-N. Similarly, in another example embodiment, the management server 105-1 to 105-X is programmed to mount a block storage from the cloud storage system 109 as a file system, and in turn present the mounted file system to an NFS protocol of the cloud gaming server 103-1 to 103-N. In some embodiments, the block storage is based on Ceph RBD (RADOS (Reliable Autonomic Distributed Object Store) Block Device). However, in other embodiments, the block storage can be based on any type of block data storage protocol.

Having the management server 105-1 to 105-X acting as a proxy in the data path between the cloud gaming server 103-1 to 103-N and the cloud storage server 109 can add some latency in fulfilling data access requests issued by the cloud gaming server 103-1 to 103-N. However, having the management server 105-1 to 105-X acting as a proxy in the data path between the cloud gaming server 103-1 to 103-N and the cloud storage server 109 provides more flexibility in how data transfer is managed between the cloud storage server 109 and the cloud gaming server 103-1 to 103-N. For example, in some embodiments, the management server 105-1 to 105-X can operate to buffer data input/output requests issued by the cloud gaming server 103-1 to 103-N and/or cache data, if needed. For example, if the cloud storage server 109 is busy or not immediately available for some reason, the management server 105-1 to 105-X can absorb this lack of availability of the cloud storage server 109 by buffering the data input/output requests issued by the cloud gaming server 103-1 to 103-N.

Conventionally, interaction between the cloud gaming server 103-1 to 103-N and the management server 105-1 to 105-X/cloud storage server 109 is somewhat decoupled. For example, the cloud gaming server 103-1 to 103-N is presented a network file system, and some network storage software manages data read and write operations for the cloud gaming server 103-1 to 103-N. In this situation, the management server 105-1 to 105-X is simply involved in mounting data from the cloud storage server 109, but has no knowledge about which data is being read or written by the video game executing on the cloud gaming server 103-1 to 103-N, or about which data the video game is accessing.

The next-generation of game consoles will use fast NVMe data storage drives, which operate at a data rate of 4-5 gigabytes per second (GB/s). For comparison, a 2.5 inch HDD, as currently used in the cloud storage system 109, peaks at a data rate of 100 megabytes per second (MB/s). Also, the HDD has a much higher latency than the NVMe data storage drive. For example, a typical HDD latency is within a range extending from about 10 milliseconds to about 20 milliseconds, whereas a typical NVMe data storage drive latency is less than about 0.1 millisecond. With increasing storage performance, the expectation reflected in the programming of video games on how fast video games can access data storage also increases. Video games often make assumptions about data storage performance. If the actual data storage performance differs too much from the data storage performance that is assumed by the video game, the video game may crash or some other undefined behavior may occur within the video game.

In some embodiments, the same video games that are used/executed on the local game console 127 are also stored in the storage server 107 and executed by the cloud gaming server 103-1 to 103-N in cloud gaming, often without modification. These video games are developed using performance assumptions based on the video game being executed on the local game console 127 that has the faster storage solution, particularly with regard to data read and write operations. Therefore, when the same video games are executed on the cloud gaming server 103-1 to 103-N, the performance of the data storage solution implemented for the cloud gaming server 103-1 to 103-N should substantially match or exceed the performance of the local data storage solution available on the local game console 127.

The data storage solution implemented in the cloud gaming system 100 needs to be updated to keep up with the data read and write performance expectations of next-generation video games, as set by the very fast data storage solutions implemented on the next generation of local game consoles 127. In some embodiments, the existing cloud storage server 109 could be updated to use a fast NVMe storage solution. However, this approach is prohibitively expensive. Therefore, an objective for a balanced solution is to keep data stored on the performance-limited HDDs in the cloud storage server 109 to reduce expense, while also ensuring that data currently needed by the video game is available through fast storage within the management server 105-1 to 105-X. This objective can be accomplished by close cooperation between the cloud gaming server 103-1 to 103-N and the cloud storage solution, which is essentially a reversal of the conventional decoupling of the interaction between the cloud gaming server 103-1 to 103-N and the management server 105-1 to 105-X/cloud storage server 109. In some embodiments, the close cooperation between the cloud gaming server 103-1 to 103-N and the cloud storage solution will involve hooking into file system APIs (Application Programming Interfaces) that are called by the video game executing on the cloud gaming server 103-1 to 103-N, in order to obtain information on which data the video game is currently accessing, which data the video game may access next/soon, and when the video game is done using particular data.

File system access APIs trigger data access to occur at a particular time for a particular reason. Various operating systems follow the POSIX (Portable Operating System Interface) standards, which define APIs on many operating system concepts including file system access. Four of the most common POSIX APIs for file system access are "open," "close," "read," and "write." The "open" API is used to open a file. The "close" API is used to close the file and triggers writing data back to the data storage device, in the event that data had not already been written back to the data storage device. The "read" API is used to read data. The "write" API is used to write data. The "open" and "close" APIs are considered control path APIs, which are APIs used to obtain access to files or modify permissions. The "read" and "write" APIs are considered data path APIs, which are APIs used to access or modify data.

In some embodiments, video game console APIs leverage the POSIX APIs, but with some additions. On a regular personal computer or server computer, there is typically a single data storage device, such as an HDD or SSD, with one or multiple partitions, and with each partition configured with a file system. The storage system of a video game console is configured in a manner similar to that of the personal computer or server computer. However, on the video game console, for reasons of security and user isolation, save data and other user data is often stored in save data disk images, with each save data disk image corresponding to an individual save slot for a video game. Each save data disk image has its own file system, which needs to be mounted prior to use and unmounted after use. The "mount" operation and the "unmount" operation are performed by respective APIs that are considered control path APIs. Therefore, an example of a data access flow in a video game console is as follows: 1) (optional, as needed) create save data disk image, 2) mount save data disk image, 3) open file, 4) read and/or write data from/to file, 5) close file, and 6) unmount save data disk image.

The performance-critical part of the data access flow in a video game is in the data path that uses the "read" and "write" APIs. In the case of a data "read" operation, the video game may expect the data to be delivered back within a certain amount of time in order to support continued correct execution of the video game. Similarly, in the case of a data "write" operation, the video game may expect data to be written within a certain amount of time in order to support continued correct execution of the video game. If the storage solution cannot perform the data "read" and/or "write" operations in the required amount of time, bad things can happen within the execution of the video game. The exact types of these bad things that can happen depends on the design of the video game and how the video game code is written. Some examples of the types of these bad things that can happen include crashing of the video game, undefined behavior within the video game, and/or stuttering within the video game, among others.

When the video game calls the data "read" API or the data "write" API, the video game passes one or more flags to the called API. These flags can be set to control how the called API is executed. Both data read and data write behavior in a video game depends on the flags that the video game passes to the called APIs and how the video game is structured. For example, in some video games, data read and data write operations can be flagged as synchronous, which means that the data "read" API and the data "write" API will block continued video game execution until the data read and data write operations are completed. If a video game is written to call for synchronous data read or data write from a piece of code doing game rendering, the video game may slow-down or stutter whenever the read or write operation takes longer to complete due to a slow storage device. However, if the video game flagged a data write operation as asynchronous, which is usually done for data write operations, then the video game will hand the data to be written to the operating system and continue on with execution of the video game without waiting for the data to be written. The location of data read and data write operations in video games and the flags associated with the data read and data write operations depends on the design of the video game. Well written video games will at least try to have data read and data write operations performed in smart areas of the video game code so as to avoid interfering with smooth video game execution.

The control path APIs, such as "mount," "open," "close," and "unmount," are also important, but are often expected to block continued execution of the video game until they are completed. Therefore, timely execution of control path APIs is generally not as critical to performance of the video game. For example, a video game cannot do anything with data storage until the "mount" and "open" API calls have completed, and the video game designers are aware of this. The control path APIs are used in the systems and methods disclosed herein to meet the objective of having a balanced storage solution that continues to have data stored on the performance-limited HDDs in the cloud storage server 109 to reduce expense, while also ensuring that data currently needed by the video game is made available fast from storage devices within the management server 105-1 to 105-X.

Modern video game generate large amounts of user data. Depending on the video game and the video game platform (video game console), there can be many different types of user data generated for a video game for a given user. For example, in some embodiments, user data includes save data for the user, download data for the user, recording data for the user (which is a recording of the user's game play, in a buffer or for an amount of time most recently played), trophy data for the user, profile data for the user, video data for the user, audio data for the user, suspend and resume data for the user (which captures the entire state of the online gaming system at a particular time), among other types of data for the user. Save data is a part of user data and is usually a data image for a video game that includes all of the data about the game state and the user's state within the game at a particular save time. As the video game is played by the user, there can be many save data images created for the user. For example, in some embodiments, save data for the user is generated at particular points during game play, such as when transitioning from one level to another, or when changing from one scene to another, among many other times/instances at which generation of save data is triggered. Also, in some embodiments, generation of save data is triggered through menu selection by the user. A save data disk image for a user is a few megabytes (MB) in size.

In some embodiments, different types of user data may have different types of input/output (I/O) requirements, e.g., different types of data access performance requirements. So, in some embodiments, different types of user data may be stored on different cloud storage systems or different cloud storage servers that satisfy the different types of I/O requirements. Also, in some embodiments, the reliability of certain data is less important than the reliability of other data. Reliability of data in this sense refers to ensured protection and availability of data. For example, the reliability of save data for a user is extremely important. But, the reliability of suspend and resume data, which is huge in size, may not be as critical. Therefore, it may not be as damaging to the user to lose the suspend and resume data for the user as it is to lose the save data for the user. Also, in some embodiments, some types of user data have a limited lifetime associated with them. For example, a system update or video game update may cause some types of user data to no longer be compatible with or relevant to the user's play of the video game. Also, in some embodiments, different types of data can have different load timing requirements. For example, system data and/or user profile data may need to be loaded from the cloud storage server 109 into the management server 105-1 to 105-X immediately when the user logs into the system. And, other data may be loaded from the cloud storage server 109 into the management server 105-1 to 105-X when a particular game is started. Given the possible variations in I/O requirements, reliability, lifetime, and load timing among various types of user data and system data, there can be different performance tiers and different reliability tiers of cloud storage servers across which user data and system data is stored.

The control path APIs provide information on what data the video game is about to access. For example, if the video game is about to read data from a particular file in a particular save data disk image, the video game has to first mount the particular save data disk image by way of the "mount" API call, and then open the particular file within the mounted save data disk image by way of the "open" API call. In this case, the calling of the "mount" API and/or the "open" API by the video game provides information that the video game is about to access data in the particular save data disk image. In some embodiments, the information obtained from the control path API call made by the video game executing on the cloud gaming server 103-1 to 103-N is used to trigger advance retrieval of data associated with the control path API call from the slower HDD-based cloud storage server 109 and store the retrieved data in high-speed memory within the management server 105-1 to 105-X. Then, any subsequent data path API calls made by the video game that are directed to the retrieved data will be completed at high speed by accessing the data within the high-speed memory within the management server 105-1 to 105-X. Then, when the video game is done with the data in the high-speed memory within the management server 105-1 to 105-X, such as when the "unmount" control path API call is made, the data in the high-speed memory within the management server 105-1 to 105-X is flushed back to the slower HDD-based cloud storage server 109, where flushed means that the data in the high-speed memory within the management server 105-1 to 105-X is copied to the slower HDD-based cloud storage server 109 and is then removed from the high-speed memory within the management server 105-1 to 105-X. Depending on implementation, the "write" API call may already write data back to the cloud storage server 109. This can happen through the operating system in a manner that is transparent to the executing video game. The "unmount" API call always forces flushing of the data that is to be unmounted to the cloud storage server 109. However, if the data has already been written back to the cloud storage server 109 by way of the "write" API call as a normal course of operation, then no data flushing has to be done when the "unmount" API call is made because the data has already been written back to the cloud storage server 109.

Figure 2:
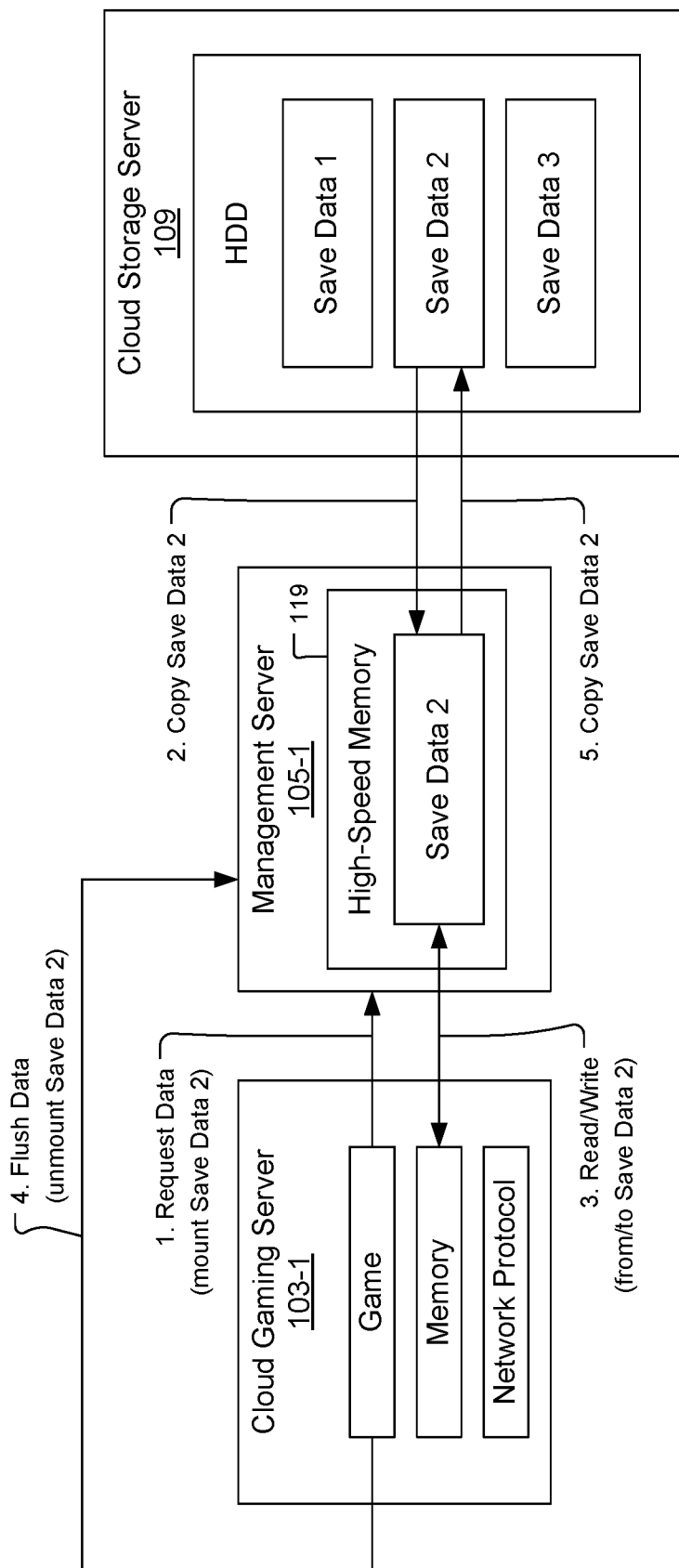
FIG. 2 shows a process diagram of how control path API calls by the cloud gaming server are used to trigger transfer of data from the slower data storage devices in the cloud storage server to a high-speed data storage device in the management server in advance of data path API calls by the cloud gaming server to access the transferred data, in accordance with some embodiments.

FIG. 2 shows a process diagram of how control path API calls by the cloud gaming server 103-1 are used to trigger transfer of data from the slower data storage devices in the cloud storage server 109 to a high-speed data storage 119 in the management server 105-1 in advance of data path API calls by the cloud gaming server 103-1 to access the transferred data, in accordance with some embodiments. In a first step, the cloud gaming server 103-1 issues a control path API call to mount a particular save data disk image (Save Data 2 in the example of FIG. 2). In response, the management server 105-1 mounts the particular save disk image. In a second step, the particular save disk image that the cloud gaming server 103-1 to 103-N requested to be mounted (e.g., Save Data 2) is copied from the cloud storage server 109 to the high-speed data storage 119 in the management server 105-1. In some embodiments, the high-speed data storage 119 is a computer memory device such as RAM or storage class memory, or another type of computer memory substantially equivalent to RAM and/or storage class memory. In some embodiments, the high-speed data storage 119 is NVMe-level storage, such as an SSD. In a third step, the cloud gaming server 103-1 issues one or more data path API calls to read and/or write data from/to the particular save disk image. However, rather than have the cloud storage server 109 service the data path API calls from the cloud gaming server 103-1, the data path API calls are instead serviced by the that management server 105-1 that currently has the particular save disk image in its high-speed data storage 119.

In a fourth step, the cloud gaming server 103-1 issues a control path API call to unmount the particular save data disk image. In response to the unmount API call, the storage system performs a fifth step in which the management server 105-1 operates to copy the data of the particular save disk image currently in its high-speed data storage 119 back to the cloud storage server 109. In some embodiments, if the data written to the particular save disk image in the high-speed data storage 119 is copied back to the cloud storage server 109 during the normal course of operation (e.g., as it is written into the high-speed data storage 119), there may not be any data that needs to be copied back to the cloud storage server 109 upon issuance of the unmount API call by the cloud gaming server 103-1. It should be understood that in response to the unmount API call by the cloud gaming server 103-1, the management server 105-1 operates to ensure that the current data of the particular save disk image, as stored in the high-speed data storage 119 of the management server 105-1 at the time of issuance of the unmount API call, is also stored in the cloud storage server 109. Once the management server 105-1 confirms that all of the current data of the particular save disk image is properly stored in the cloud storage server 109, the management server 105-1 operates to unmount the particular save disk image in accordance with the unmount API call.

In some embodiments, the user's game data is maintained in the management server 105-1 to 105-X while the user is playing the video game. The management server 105-1 to 105-X should have enough storage capacity to handle the storage needs during playing of the video game by the user. In some embodiments, the management server 105-1 to 105-X operates to reserve an amount of storage for each active user. In the case of storage pressure/overload on the management server 105-1 to 105-X, as one option, the management server 105-1 to 105-X can direct storage access API calls to be handled by the cloud storage server 109, rather than by the management server 105-1 to 105-X. As another option, the management server 105-1 to 105-X can flush some data back to the cloud storage server 109 to relieve the storage pressure/overload on the management server 105-1 to 105-X. In this case, the management server 105-1 to 105-X will flush either all data or a portion of data back to the cloud storage server 109. In some embodiments, operations to flush data back to the cloud storage server 109 from management server 105-1 to 105-X in order to relieve storage pressure/overload on the management server 105-1 to 105-X will be based on analysis of current storage needs and usage patterns of all users that have currently have data stored in the management server 105-1 to 105-X. In some embodiments, if the management server 105-1 to 105-X flushes data back to the cloud storage server 109 to relieve storage pressure/overload, the management server 105-1 to 105-X will copy some data back from the cloud storage server 109 in expectation that it will be needed by one or more video games executing on one or more cloud gaming server 103-1 to 103-N that are serviced by the management server 105-1 to 105-X. In some embodiments, when a video game writes data to the management server 105-1 to 105-X, that data will be maintained in the management server 105-1 to 105-X for access by the video game, even if that data gets copied over to the cloud storage server 109 at some time. In some embodiments, there are various algorithms implemented for classifying the data that is stored in the management server 105-1 to 105-X at a given time in order to prioritize the flushing back of data to the cloud storage server 109 in the event that there is pressure/overload on the management server 105-1 to 105-X. Also, in some embodiments, in the case of storage pressure/overload on the management server 105-1 to 105-X, as another option, the management server 105-1 to 105-X can notify the cloud gaming server 103-1 to 103-N and/or or video game of the storage pressure/overload situation, and have the cloud gaming server 103-1 to 103-N and/or or video game trigger flushing of data back to the cloud storage server 109 to relieve the storage pressure/overload situation. This option can be used to prevent data loss by blocking the cloud gaming server 103-1 to 103-N and/or or video game from doing any data updates as the management server 105-1 to 105-X operates to flush data back to the cloud storage server 109.

In some embodiments, the process of FIG. 2 can be particularly beneficial at the beginning of an online gaming session by the user. When the user starts an online video game, the cloud gaming server 103-1 to 103-N has to load the executable code of the online video game from the storage server 107. Also, the cloud gaming server 103-1 to 103-N may have to load other data, such as audio data and/or texture day, among other data, to get the video game started. It takes some time for the cloud gaming server 103-1 to 103-N to load this data and execute the video game to a game menu presentation state, such as about 5 seconds. This time can be used to load the user data for the user from the cloud storage server 109 into the management server 105-1 to 105-X. For example, this time at startup of the video game, can be used to load the user data for the user corresponding to the user's last save point in the video game from the cloud storage server 109 to the management server 105-1 to 105-X. Then, when the video game presents the game menu options, such as new game or load game, the user data for the user for the user's last save point in the video game is already stored in the high-speed data storage 119 of the management server 105-1 to 105-X and ready for immediate and fast access by the cloud gaming server 103-1 to 103-N in case the user selects to continue playing of the video game from the last save point. Then, when the user selects to load the game previously saved, an open API call is made the video game executing on the cloud gaming server 103-1 to 103-N to open the save data file for the user in previous save data disk image. This open API call is processed by the management server 105-1 to 105-X, such that the requested save data file is read from the high-speed data storage 119 in the management server 105-1 to 105-X, rather than from the slower cloud storage server 109. It should be appreciated that by reading the user's save data file from the high-speed data storage 119 in the management server 105-1 to 105-X, the user's play of the video game is able to start faster. During execution of the video game on the cloud gaming server 103-1 to 103-N, the video game can issue additional data storage access API calls that trigger copying of additional data from the cloud storage server 109 to the high-speed data storage 119 in the management server 105-1 to 105-X, so that data requested by the video game can be accessed with high speed from the high-speed data storage 119 in the management server 105-1 to 105-X.

In some embodiments, the cloud gaming server 103-1 to 103-N maintains a database of where user data is stored in the cloud storage server 109. In some embodiments, the management server 105-1 to 105-X shields the cloud gaming server 103-1 to 103-N from the cloud storage server 109, so that the cloud gaming system 103-1 to 103-N does not need to keep track of where data is stored in cloud storage server 109. In some embodiments, the management server 105-1 to 105-X maintains a storage tracking database that includes information indicating where various data is stored in the cloud storage server 109. When the management server 105-1 to 105-X gets a request for a particular type of user data from the cloud gaming server 103-1 to 103-N, by way of a data storage access API call, the management server 105-1 to 105-X operates to query the storage tracking database to determine the identity of the cloud storage server 109 in which the requested data is located, and where in the identified cloud storage server 109 the requested data is located. Then, the management server 105-1 to 105-X sends a request for the data to the identified cloud storage server 109. In some embodiments, the storage tracking database is stored on the cloud storage server 109 and loaded into the high-speed data storage 119 of the management server 105-1 to 105-X where the storage tracking database is accessed and queried.

In some embodiments, the storage tracking database on the management server 105-1 to 105-X is queried to determine which user data files need to be updated in other data centers in order to maintain current redundancy and synchronization of user data in multiple data centers, because the user is on travel and/or for data backup purposes, and/or for some other reason. Also, in some embodiments, the user will play the video game on the local game console 127, rather than on the cloud gaming server 103-1 to 103-N. In these embodiments, the storage tracking database on the management system 105-1 to 105-X is used when the local game console 127 needs to access data stored on the cloud storage server 109, by way of the management server 105-1 to 105-X. Also, in some embodiments, the storage tracking database on the management server 105-1 to 105-X is used to enable synchronization of local play of the video game by the user on the local game console 127 with cloud game play of the video game by the user on the cloud gaming server 103-1 to 103-N.

In some embodiments, the local game console 127 is equipped with an SSD, which wears down by writing data to it. Knowing this, the video game developers program the video game to direct storage operations in a manner that considers the limited lifetime of SSD, which corresponds to a limited number of program/write cycles that can be endured by memory units within the SSD. Also, the video game developers program the video game with consideration that writing of small amounts of data to the SSD is particularly problematic. Therefore, for many video games, the flash memory in the SSD-equipped local game console 127 is not allowed to write small blocks of data to the SSD, and instead has to hold onto data until enough data is accumulated to write a bigger block of data to the SSD. To reduce the amount of write/program cycles to the SSD, the video games are programmed to use "transactions" for storage access. Use of transactions for storage access is also beneficial for reducing risk of data corruption, among things. The idea behind the use of transactions for storage access is that the video game still uses POSIX API calls, such as read, write, etc., but any data that is written is only stored in RAM until the transaction is completed at which time the video game calls a "commit" API to trigger flushing of the data stored in the RAM into the SSD. The unmount API is an "implicit commit." Therefore, a data access flow in the SSD-equipped local game console 127 that uses transactions for storage access is as follows: 1) (optional, as needed) create save data disk image, 2) create transaction resource, 3) mount save data disk image, 4) open file, 5) read and/or write data from/to file (write to RAM only), 6) close file, 7) commit data, 8) remove transaction resource, and 9) unmount save data disk image. Given that the cloud gaming system may be executing the same video games that are executed on the SSD-equipped local game console 127, the cloud gaming server 103-1 to 103-N, the management server 105-1 to 105-X, and the cloud storage server 109 are collectively configured to handle use of transactions for storage access.

In some embodiments, a transaction data buffer can be provided by either the video game or the cloud gaming system 103-1 to 103-N. In some embodiments, the transaction data buffer is in RAM. In some embodiments, the cloud gaming system 103-1 to 103-N has the video game provide the transaction buffer because the transaction buffer is small in size. Also, by having the video game provide the transaction buffer, the video game is aware of the limited capacity of the transaction buffer. In some embodiments, when the video game writes too much data using the standard data path "write API," the write operation will fail with an error of not having enough space to complete the write operation.

In some embodiments, when the cloud gaming server 103-1 to 103-N calls the commit API, the cloud gaming server 103-1 to 103-N allows the management server 105-1 to 105-X to also commit its buffer changes back to the cloud storage server 109. In some embodiments, if the commit API call is a blocking API call (either by default or by setting a flag), the commit API call makes the video game wait until the management server 105-1 to 105-X completes flushing of the data back to the cloud storage server 109. Otherwise, it is possible for data corruption to occur in the event that the management server 105-1 to 105-X crashes.

In some embodiments, in order to prevent data corruption, there is a mechanism to revert to a data state that existed prior to performing the commit/unmount operation, just in case a power failure or other error condition occurs during the commit/unmount operation. For example, in some embodiments, before committing the data, the system reads any of the data which is expected to be updated, so that the read data can be recovered in the event of a problem with the commit operation. In some embodiments, the management server 105-1 to 105-X is programmed to read any of the data which is expected to be updated before performing the commit API operation. The management server 105-1 to 105-X is programmed to track what data it was requested to change and how it was requested to change that data. Also, in some embodiments, the cloud storage server 109 is configured to support transactions. In these embodiments, upon mount by the management server 105-1 to 105-X, the cloud storage server 109 tracks data changes. Then, a commit/unmount API call triggers flushing of the data changes. If flushing of the data changes from the management server 105-1 to 105-X to the cloud storage server 109 is unsuccessful, the cloud storage server 109 can be used to revert the data changes.

Figure 3:
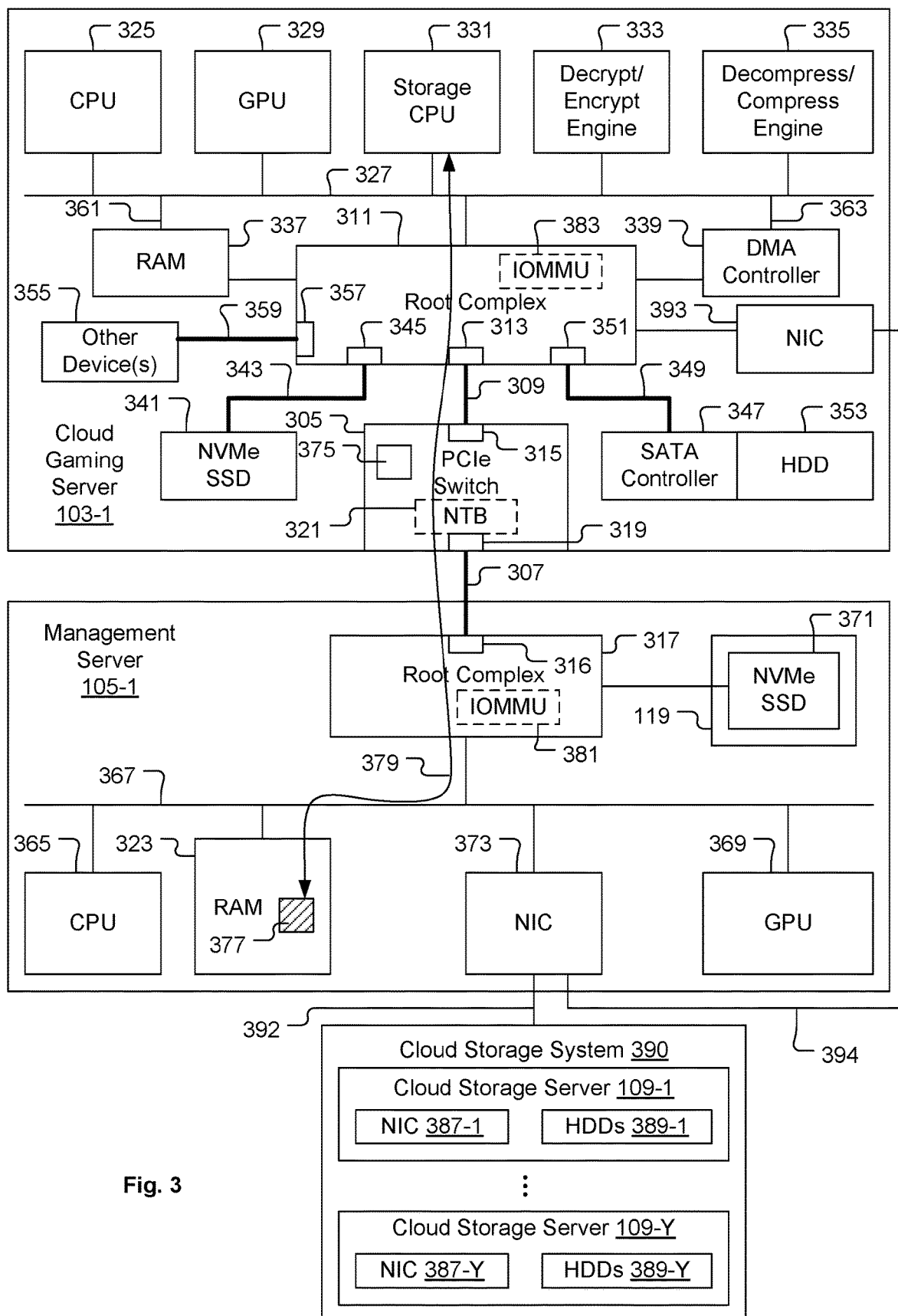
FIG. 3 shows an example diagram of some internal components of the cloud gaming server and the management server, in accordance with some embodiments.

FIG. 3 shows an example diagram of some internal components of the cloud gaming server 103-1 and the management server 105-1, in accordance with some embodiments. A root complex 311 of the cloud gaming server 103-1 has a PCIe (peripheral component interconnect express) port 313 connected to a PCIe port 315 of a PCIe switch 305 through a PCIe link 309. Also, a root complex 317 of the management server 105-1 has a PCIe port 316 connected to a PCIe port 319 of the PCIe switch 305 through a PCIe link 307. The PCIe switch 305 includes logic to bridge the memory address spaces of the management server 105-1 and the cloud gaming server 103-1. For example, the logic for bridging the memory address spaces of the management server 105-1 and the cloud gaming server 103-1 can include a non-transparent bridge (NTB) or a special direct memory access (DMA) engine that can communicate with both the management server 105-1 and the cloud gaming server 103-1 and take care of any memory address translation that is required. In some embodiments, a DMA engine can be implemented within the PCIe switch 305. It should be understood that both the root complex 311 of the cloud gaming server 103-1 and the root complex 317 of the management server 105-1 include a PCIe interface or equivalent interface, such as a Gen-Z interface defined in accordance with the Gen-Z communication/interconnect specification developed by the Gen-Z Consortium, by way of example, or other future-developed interface that is essentially equivalent to either the PCIe interface or the Gen-Z interface.

For example, in some embodiments, the PCIe switch 305 optionally includes an NTB 321. If the PCIe switch 305 includes the NTB 321 and is in NTB mode, the NTB 321 functions to translate the physical memory address in a memory access command written to a data I/O (input/output) command buffer by the cloud gaming server 103-1 to a memory address that is reachable by the management server 105-1 within a computer memory 323 of the management server 105-1. The NTB 321 functionally operates to modify memory addresses at the PCIe transaction layer in which transaction layer packets (TLP's) are assembled and disassembled. In some embodiments, the NTB 321 also operates to modify requester identifiers. If the cloud gaming server 103-1 generates a command buffer, such as by way of a storage CPU 331, the command buffer is ultimately wrapped in a TLP by the root complex 311. The storage CPU 331 operates to ensure the correctness of any memory addresses within the command buffer generated by the storage CPU 331. Also, the storage CPU 331 operates to ensure that any memory addresses within the command buffer are translated addresses in case the management server 105-1 needs to write data back to the cloud gaming server 103-1. The NTB 321 comes into play when the cloud gaming server 103-1 writes a command buffer to a memory address in the management server 105-1. In this case, the memory address to which the command buffer is written is translated by the NTB 321 and/or by an Output Memory Management Unit (IOMMU) 381 in the computer memory 323 of the management server 105-1. The IOMMU 381 maps device-visible virtual memory addresses to physical memory addresses. Also, in this case, the contents of the command buffer itself is not modified by either the NTB 321 or the IOMMU 381.

The NTB mode enables multiple root complexes to talk to each other, i.e., exchange data with each other. In some embodiments, if the PCIe switch 305 is connected to a secondary PCIe switch to which only NTB devices are connected, the secondary PCIe switch does not need to use NTB, as it would just forward transaction layer packets (TLPs). The computer memory 323 represents the high-speed data storage 119 mentioned with regard to FIG. 2. In various embodiments, the computer memory 323 can be RAM or storage class memory, or another type of computer memory substantially equivalent to RAM and/or storage class memory. The NTB 321 handles translation of the memory address in the data I/O command buffer and provides the translated memory address to the management server 105-1. If the PCIe switch 305 does not use the NTB 321, the memory access command written to the data I/O command buffer can be generated to include other metadata, such as a host identifier or other type of metadata, that can be used to determine the memory address in the computer memory 323 of the management server 105-1 to which the memory address in the data I/O command buffer should be mapped. In some embodiments in which the PCIe switch 305 does not use the NTB 321, a DMA engine can be used to send packets across the PCIe switch 305 to the correct destination. And, in some embodiments, if the PCIe switch 305 does not use the NTB 321 and is connected to a secondary PCIe switch, the secondary PCIe switch operates to forward the packets to the correct destination.

The cloud gaming server 103-1 includes at least one CPU 325 connected to an internal data bus 327. In various embodiments, the cloud gaming server 103-1 can also include one or more of a GPU 329 connected to the internal data bus 327, and/or one or more of the storage CPU 331 connected to the internal data bus 327, and/or one or more of a decryption/encryption engine 333 connected to the internal data bus 327, and/or one or more of a decompression/compression engine 335 connected to the internal data bus 327. The internal data bus 327 is connected to the root complex 311 of the cloud gaming server 103-1. In various embodiments, the GPU 329 is a processor configured to perform parallel operations for rendering images, animations, and video for display on an electronic display screen. Also, in some embodiments, the parallel processing capabilities of the GPU 329 can be used for vector processing in non-graphics applications that require repetitive computations.

In various embodiments, the storage CPU 331 is configured to handle requests for storage commands and allocate storage on a specific type of storage media. In various embodiments the storage CPU 331 and the main CPU 325 can either have the same or different architectures. For example, in some embodiments, the storage CPU 331 can be an Advanced RISC (Reduced Instruction Set Computer) Machine (ARM) processor or a MIPS processor, with the main CPU 325 being an x86 processor. It should be understood that in various embodiments, the storage CPU 331 can be essentially any type of suitable computer processor, and the main CPU 325 can be essentially any type of suitable computer processor. Also, in some embodiments, instead of having both the main CPU 325 and the storage CPU 331, the cloud gaming server 103-1 to 103-N just includes the main CPU 325, which also handles the operations that would otherwise be performed by the storage CPU 331. However, for purposes of description herein, the cloud gaming server 103-1 to 103-N is considered to include both the main CPU 325 and the storage CPU 331. The specific type of storage media to which the storage CPU 331 allocates data for storage can vary depending on the performance capabilities, e.g., data read speed and/or data write speed, of the storage media and/or the form in which data is stored on the storage media, e.g., file-based data storage, folder-based data storage, or byte-based data storage. In some embodiments, the storage CPU 331 operates to split data into multiple data chunks for placement into respective locations in a computer memory 337 of the cloud gaming server 103-1, with the various storage locations in the computer memory 337 being tracked and updated based on a storage table. In various embodiments, the computer memory 337 can be RAM or storage class memory, or another type of computer memory substantially equivalent to RAM and/or storage class memory. The storage CPU 331 can also function to optimize storage based on Input/Output Operations per Second (IOPS). In some embodiments, storage optimization based on IOPS can be correlated to the access speeds of the available storage media, which can include rotating storage media, solid-state storage media, and/or hybrid storage media. In various embodiments, the decryption/encryption engine 333 is a processor configured for and dedicated to applying cryptographic algorithms to decrypt encrypted data and to encrypt non-encrypted data. In various embodiments, the decompression/compression engine 335 is configured for and dedicated to applying algorithms to decompress compressed data and compress non-compressed data.

In some embodiments, the computer memory 337 of the cloud gaming server 103-1 is connected to the root complex 311. In some embodiments, the cloud gaming server 103-1 also includes a DMA controller 339 connected to the root complex 311. In some embodiments, the computer memory 337 and/or the DMA controller 339 can be connected to the internal data bus 327, as indicated by lines 361 and 363, respectively. Also, in some embodiments, the cloud gaming server 103-1 can include one or more of a NVMe SSD 341 connected through a PCIe link 343 to a PCIe port 345 of the root complex 311. Also, in some embodiments, the cloud gaming server 103-1 can include one or more of a SATA controller 347 connected through a PCIe link 349 to a PCIe port 351 of the root complex 311. The SATA controller 347 can function as a bridge between one or more of a HDD 353 and the PCIe fabric. Also, in various embodiments, one or more other PCIe-enabled component device(s) 355 can be connected to respective PCIe port(s) 357 of the root complex 311 through respective PCIe links 359. In various embodiments, the other PCIe-enabled component device(s) 355 can include one or more GPU's, one or more field programmable gate arrays (FPGA's), one or more network adapters, one or more SSD's, one or more SATA/HHD's, among other devices. It should be understood that the architecture of the cloud gaming server 103-1 shown in FIG. 3 is provided by way of example. In various embodiments, the cloud gaming server 103-1 can include more or less components than what is shown in the example of FIG. 3.

The management server 105-1 includes at least one CPU 365 connected to an internal data bus 367. In various embodiments, the management server 105-1 can also include one or more of a GPU 369 connected to the internal data bus 367 and/or one or more of a network interface card (NIC) 373 connected to the internal data bus 367. The internal data bus 367 is connected to the root complex 317 of the management server 105-1. The management server 105-1 can also include one or more of a NVMe SSD 371 connected to the root complex 317. Also, in some embodiments, the GPU 369 and/or the NIC 373, and/or other device, can be configured to use PCIe and can be connected directly to the root complex 317 rather than to the internal data bus 367.

The systems and methods disclosed herein leverage the PCIe fabric that connects the cloud gaming server 103-1 with the cloud management server 105-1 to allow the CPU 325 and/or the storage CPU 331 and/or the DMA controller 339 (and/or other device) on the cloud gaming server 103-1 to direct sending of messages and copying of data between the computer memory 323 of the management server 105-1 and the computer memory 337 of the cloud gaming server 103-1, vice-versa. The result of connecting the cloud gaming server 103-1 and the management server 105-1 using the PCIe fabric and after configuring of the PCIe switch 305 is a "shared memory" mechanism across the cloud gaming server 103-1 and the management server 105-1. The cloud gaming server 103-1 can directly access a specified portion 377 of the computer memory 323 within the management server 105-1 with very little overhead, e.g., with bypassing of the CPU 365 of the management server 105-1, as indicated by the arrow 379. Direct access of the computer memory 323 within the management server 105-1 by the cloud gaming server 103-1 can be directed by any device within the cloud gaming server 103-1 that is capable of managing data storage requests and that is connected through the root complex 311 to the PCIe switch 305, such as the CPU 325 and/or the storage CPU 331 and/or the DMA controller 339. However, it should be appreciated that it may not be a most efficient use of the CPU 325 of the cloud gaming server 103-1 to manage data storage requests. Therefore, the storage CPU 331 and/or the DMA controller 339 may be primarily used to manage data storage requests of the cloud gaming server 103-1 by generating memory access commands that are written to data I/O command buffers in the computer memory 323 of the management server 105-1.

In addition to providing the "shared memory" mechanism, connection of the cloud gaming server 103-1 to the management server 105-1 through the PCIe switch 305 provides for sending of "messages" from the cloud gaming server 103-1 to the management server 105-1, and vice-versa, by writing a message directly into the computer memory 337 of the cloud gaming server 103-1 or into the computer memory 323 of the management server 105-1 or into some memory within the PCIe switch 305. Sending of messages between the cloud gaming server 103-1 and the management server 105-1 can be used to facilitate execution of memory access commands that are written to data I/O command buffers. For example, if the cloud gaming server 103-1 expects the management server 105-1 to execute some memory access command that results in some requested data being retrieved from a data storage device and stored somewhere in the shared memory that exists among the cloud gaming server 103-1 and the management server 105-1, a message can be written by the management server 105-1 to a memory location that is monitored by the cloud gaming server 103-1 to notify the cloud gaming server 103-1 when and where the requested data is available for use by the management server 105-1.

In some embodiments, messages can be sent by either the cloud gaming server 103-1 or the management server 105-1 to one or more doorbell register(s) 375 exposed through the PCIe switch 305. In some embodiments, writing to the doorbell register 375 by the cloud gaming server 103-1 will cause an interrupt to fire on the management server 105-1, which in turn causes the management server 105-1 to handle the interrupt. In some embodiments, handling of the interrupt by the management server 105-1 causes the management server 105-1 to read a message (some data) from a specified location in the shared memory that exists among the cloud gaming server 103-1 and the management server 105-1. Similarly, writing to the doorbell register 375 by the management server 105-1 will cause an interrupt to fire on the cloud gaming server 103-1, which in turn causes the cloud gaming server 103-1 to handle the interrupt. In some embodiments, handling of the interrupt by the cloud gaming server 103-1 causes the cloud gaming server 103-1 to read a message (some data) from a specified location in the shared memory that exists among the cloud gaming server 103-1 and the management server 105-1.

The content of the message depends on the use case. In some use cases, the message can convey a request to read a certain amount data from a storage device and store the read data in the shared memory that exists among the cloud gaming server 103-1 and the management server 105-1. Then, after completion of the request in the message, another message can be sent to notify of completion. For example, if the cloud gaming server 103-1 sends a first message that requests the management server 105-1 to read some particular data from data storage, the managements server 105-1 will perform the request in the first message and then send a second message that notifies the cloud gaming server 103-1 of completion of the first message request and where the particular requested data is stored in the shared memory that exists among the cloud gaming server 103-1 and the management server 105-1.

The cloud gaming server 103-1 and the management server 105-1 are independent systems that each has its own memory map. The memory map holds the memory addresses of computer memory and other devices in the system. The PCIe switch 305 takes up a user-configurable area of memory address space in each memory map of the cloud gaming server 103-1 and the management server 105-1. In various embodiments, depending on the configuration of the PCIe switch 305, physical memory addresses in the computer memory 337 of the cloud gaming server 103-1 can map to either the same or different physical memory addresses in the computer memory 323 of the management server 105-1.

In some embodiments, for security and/or other reasons, the cloud management server 105-1 can be configured to hide its real physical memory addresses, such as by implementing the IOMMU 381 that maps device-visible virtual memory addresses to physical memory addresses. The IOMMU 381 is configured to map device memory addresses to physical memory addresses, whereas a regular memory management unit (MMU) is configured to map virtual memory addresses to physical memory addresses. For the regular MMU, the virtual memory addresses are continuous so that an application can see a block of memory, e.g., a block of 64 MB of memory, and operate on the block of memory, but in reality the MMU maps the continuous virtual memory addresses to multiple separated physical memory addresses and hides the memory mapping from the application. Similar to the regular MMU, the IOMMU 381 maps virtual memory addresses that are visible to the cloud gaming server 103-1 to multiple separated physical memory addresses in the computer memory 323 and hides the memory mapping from the management server 105-1. In this manner, use of the IOMMU 381 allows the cloud gaming server 103-1 to see a continuous block of virtual memory addresses present on the management server 105-1 while hiding the complexity of how the continuous block of virtual memory addresses is actually mapped to different physical memory addresses across the computer memory 323 of the management server 105-1. In some embodiments, the IOMMU 381 is included in the root complex 317 of the management server 105-1. In some embodiments, the root complex 311 of the cloud gaming server 103-1 can also include an IOMMU 383.

In the configuration of FIG. 3, the IOMMU 381 can allow the cloud gaming server 103-1 to view a particular memory address (device address) as having a one-to-one correspondence with a particular physical memory address in the computer memory 323 of the management server 105-1, but in reality the IOMMU 381 can re-map the particular memory address as viewed by the cloud gamin server 103-1 to a different physical memory address in the computer memory 323 of the management server 105-1. Also, in some embodiments, the IOMMU 381 can be used to block access to one or more specified physical memory area(s) in the computer memory 323 of the management server 105-1 that are not authorized to be accessed by the cloud gaming server 103-1. Also, because the IOMMU 381 effectively hides memory fragmentation in the computer memory 323 of the management server 105-1 from the cloud gaming server 103-1, use of the IOMMU 381 can simplify DMA transfer operations in the cloud gaming server 103-1. For example, if the IOMMU 381 were not used to present fragmented physical memory addresses in the computer memory 323 as a continuous virtual block of memory addresses to the cloud gaming server 103-1, the cloud gaming server 103-1 would need to perform multiple DMA transfer operations or scatter/gather transactions to read data across the fragmented physical memory addresses in the computer memory 323. However, with use of the IOMMU 381 to present fragmented physical memory addresses in the computer memory 323 as a continuous virtual block of memory addresses to the cloud gaming server 103-1, the cloud gaming server 103-1 can perform a single DMA transfer operation to read data across the fragmented physical memory addresses in the computer memory 323.

In some embodiments, the management server 105-1 is connected to a cloud storage system 390 through the NIC 373 as indicated by connection 392. The cloud storage system 390 includes one or more cloud storage servers 109-1 to 109-Y. Each cloud storage server 109-1 to 109-Y includes a respective NIC 387-1 to 387-Y. Also, each cloud storage server 109-1 to 109-Y includes one or more HDDs 389-1 to 389-Y, respectively. Also, in some embodiments, some of the cloud storage servers 109-1 to 109-Y includes one or more NVMe SSDs or other types of data storage devices. In some embodiments, the cloud storage system 390 is configured and operated to distribute data storage among a plurality of physical storage media (HDDs) and utilize data deduplication methods to optimize usage of the plurality of physical storage media. The plurality of physical storage media accessible/controlled by the cloud storage system 390 can be located in a plurality of different storage boxes that are interconnected by high-speed interconnects as well as by high-speed switches. In some embodiments, the plurality of different storage boxes that include the plurality of physical storage media accessible/controlled by the cloud storage system 390 can be installed in separate locations within a data center or among multiple data centers that are geographically distributed. In some embodiments, data storage can be managed among multiple data centers using a caching system, so that data utilized or required for a specific requesting entity, e.g., for a specific remote client device used by a user to play a cloud gaming application, can be moved to particular data center that is closest to the requesting entity or that provides an acceptable quality of service for the requesting entity. In some embodiments, the caching system can utilize a migration algorithm defined to migrate user data and/or game data to specific data centers.

Access to game data is usually read-only. However, access to save data includes both read and write operations. Access to user data may be managed by the management server 105-1 to 105-X. The management server 105-1 to 105-X mounts a requested save data disk image from a cloud storage server 109-1 to 109-Y and implements a protocol necessary for data communication with the cloud storage server 109-1 to 109-Y. In various embodiments, various data communication protocols can be used for data communication between the management server 105-1 to 105-X and the cloud storage server 109-1 to 109-Y, such as TCP-based data communication protocols, e.g., Ceph, NFS, Amazon S3 (http based), etc., or some other kind of object, file, or block storage protocol. As discussed above, in some embodiments, the cloud gaming server 103-1 to 103-N is in data communication with the management server 105-1 to 105-X using PCI Express. In some embodiments, the cloud gaming server 103-1 to 103-N is in data communication with the management server 105-1 to 105-X over a network by way of a NIC 393 connected to the NIC 373, as indicated by connection 394. The data communication between the cloud gaming server 103-1 to 103-N and the management server 105-1 to 105-X is done in accordance with one or more of various data communication protocols, such as Ethernet (TCP/IP), RDMA, InfiniBand, among others.

The data communication path followed by save data (and other user data) is somewhat similar to game data. In both cases, the CPU 325 of the cloud gaming server 103-1 to 103-N generates command buffers corresponding to different control path APIs and data path APIs. The command buffers are processed by the storage CPU 331 of the cloud gaming server 103-1 to 103-N. The storage CPU 331 directs transmission of the command buffers to the management server 105-1 to 105-X, which will have cloud storage mounted from one or more of the cloud storage servers 109-1 to 109-Y. In some embodiments, the control path APIs can be transmitted over a network connection, such as Ethernet, RDMA, InfiniBand, among others. However, performance critical command buffers, such as those that include data path APIs, will be transmitted over the fast data connection to the management server 105-1 to 105-X, such as over the PCIe fabric. The management server 105-1 to 105-X is programmed to operate the CPU 365 to receive and process the command buffers receive from the cloud gaming server 103-1 to 103-N. In accordance with the command buffers received from the cloud gaming server 103-1 to 103-N, the management server 105-1 to 105-X operates to retrieve data from the cloud storage system 390 as needed, using a network protocol such as Ethernet, Ceph, NFS, S3, among others. For example, in some embodiments, the "mountSaveDiskImage" control path API triggers a transfer of data from an HDD 389-1 to 389-Y in a given cloud storage server 109-1 to 109-Y to the RAM 323 or NVMe SSD 371 within the management server 105-1 to 105-X. In some embodiments, the read/write data path APIs access or modify data in the RAM 323 of the management server 105-1 to 105-X. The process by which data is written back to the cloud storage system 390 depends on whether or not transactions are used. Without use of transactions, the write/close/unmount APIs will flush data back to the cloud storage system 390 from the management server 105-1 to 105-X. With use of transactions, the commit API will flush any changes in data back to the cloud storage system 390 from the management server 105-1 to 105-X.

Various embodiments of the cloud gaming system 100 are disclosed herein that include a cloud gaming server 103 (where the cloud gaming server 103 is any of the cloud gaming servers 103-1 to 103-N), the cloud storage server 109 (where the cloud storage server 109 is any of the cloud storage servers 109-1 to 109-Y), and a management server 105 (where the management server 105 is any of the management servers 105-1 to 105-X). The cloud gaming server 103 is configured to execute a video game in accordance with inputs received from the controller device 125 of the user 121. The cloud gaming server 103 is configured to direct transmission of a video stream reflecting play of the video game by the user 121 to the local computing system 120 of the user 121. The cloud storage server 109 is in data communication with the cloud gaming server 103. The cloud storage server 109 includes a data storage device 389 for storing user data for the user 121 (where the data storage device 389 is the data storage device 389-1 to 389-Y in the corresponding cloud storage server 109-1 to 109-Y). The user data includes data that memorializes the play of the video game by the user 121. The management server 105 is in data communication with both the cloud gaming server 103 and the cloud storage server 109. The management server 105 includes a high-speed data storage device, such as the NVMe SSD 371, that operates at a higher data rate and a lower latency than the data storage device within the cloud storage server 109. In some embodiments, the data storage device within the cloud storage server 109 is an HDD, and the high-speed storage device is an NVMe SSD. The management server 105 is programmed to receive a data access request issued by the video game executing on the cloud gaming server 103. The data access request identifies requested data stored in the data storage device 389 within the cloud storage server 109. The management server 105 is programmed to copy the requested data from the data storage device 389 within the cloud storage server 109 into the high-speed data storage device 371 within the management server 105. The management server 105 is also programmed to respond to the data access request using the high-speed data storage device 371 instead of having the cloud storage server 109 respond to the data access request.

It should be understood that there is a difference in storage performance between the management server 105-1 to 105-X and the cloud storage server 109, with the NVMe SSD of the management server 105-1 to 105-X operating to provide data to the cloud gaming server 103-1 to 103-N much faster than the HDD of the cloud storage server 109. There is also a difference in network performance between the management server 105-1 to 105-X and the cloud storage server 109, with the management server 105-1 to 105-X providing higher network data transmission rates (higher network bandwidth) to and from the cloud gaming server 103-1 to 103-N, as compared with the cloud storage server 109. By using the management server 105-1 to 105-X as a data cache, the data load on the network communication with the cloud storage server 109 can be limited. Use of the management server 105-1 to 105-X as a data cache ensures that read operations from the cloud storage server 109 can be done with very high performance. In some embodiments, without having the management server 105-1 to 105-X provide a cache, the effective data communication bandwidth with the cloud storage server 109 may be significantly lower.

In some embodiments, the cloud storage server 109 is in a different location than the cloud gaming server 103-1 to 103-N. In some embodiments, a number of cloud gaming servers 103-1 to 103-N are placed at Internet Service Providers (ISPs). This is cheaper for operational reasons as ISPs provide power and internet connections for free. In such embodiments, the network bandwidth between the ISP's data center and the cloud gaming data center should be good, but not necessarily good enough for the cloud gaming server 103-1 to 103-N to directly write data to NVMe SSD drives in the cloud storage server 109. Therefore, in these embodiments, the data caching function provided by the management server 105-1 to 105-X is still beneficial, even though the cloud storage server 109 implements NVMe SSD drives, which are faster than HDDs.

In some embodiments, the management server 105 is programmed to have bi-directional data communication with the cloud storage server 109 using a first network storage protocol, and the management server 105 is programmed to having bi-directional data communication with the cloud gaming server 103 using a second network storage protocol that is different from the first network storage protocol. In some embodiments, the second network storage protocol is PCIe.

In some embodiments, the data access request issued by the video game executing on the cloud gaming server 103 is a request to mount a particular grouping of data. The management server 105 is programmed to respond to subsequent data access requests to the particular grouping of data as issued by the video game executing on the cloud gaming server 103 by using the high-speed storage device 371 instead of having the cloud storage server 109 responding to the subsequent data access requests. In some embodiments, the particular grouping of data is a data object, a data file, or a data block. In some embodiments, the particular grouping of data is a save data disk image for the video game that includes save data for the user's play of the video game.

In some embodiments, a subsequent data access request issued by the video game executing on the cloud gaming server 103 is either a read API call or a write API call or an unmount API call or a commit API call. In some embodiments, the management server 105 is programmed to respond to the write API call by writing data into the particular grouping of data within high-speed storage device 371 within the management server 105. In some embodiments, the management server 105 is programmed to respond to the write API call by writing data into both the particular grouping of data within high-speed storage device 371 within the management server 105 and the particular grouping of data in the data storage device 389 within the cloud storage server 109. In some embodiments, the management server 105 is programmed to respond to the read API call by reading data from the particular grouping of data within high-speed storage device 371 within the management server 105. In some embodiments, the management server 105 is programmed to respond to the unmount and commit API calls by ensuring that all data currently in the particular grouping of data within high-speed storage device 371 within the management server 105 is also currently present in the particular grouping of data in the data storage device 389 within the cloud storage server 109.

Figure 4:
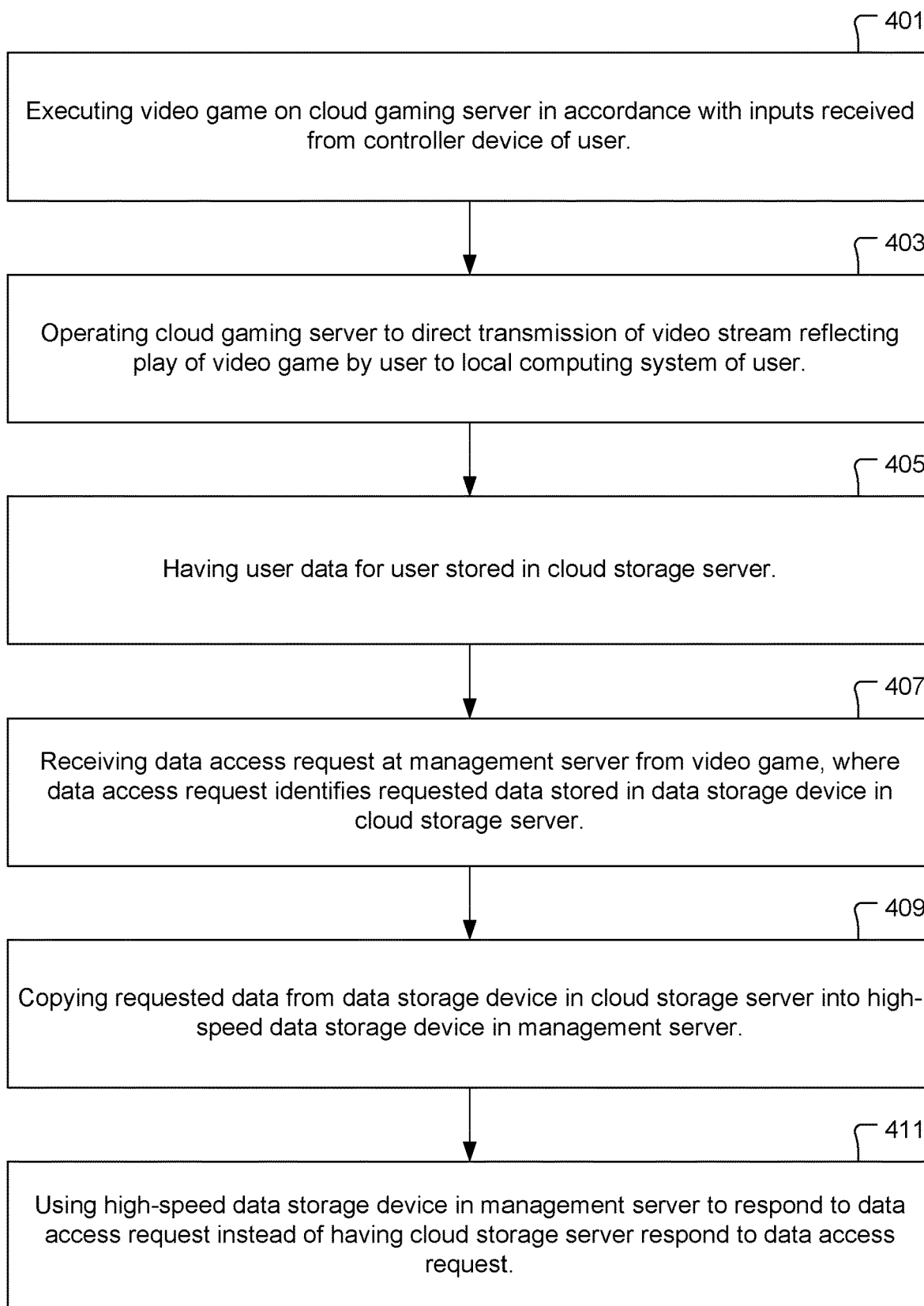
FIG. 4 shows a flowchart of a method for operating the cloud gaming system, in accordance with some embodiments.

FIG. 4 shows a flowchart of a method for operating the cloud gaming system 100, in accordance with some embodiments. The method includes an operation 401 for executing a video game on the cloud gaming server 103 in accordance with inputs received from the controller device 125 of the user 121. The method also includes an operation 403 for operating the cloud gaming server 103 to direct transmission of a video stream reflecting play of the video game by the user 121 to the local computing system 120 of the user 121. The method also includes an operation 405 for having user data for the user 121 stored in the cloud storage server 109. The user data includes data that memorializes the play of the video game by the user 121. The method also includes an operation 407 for receiving a data access request at the management server 105. The data access request is issued by the video game executing on the cloud gaming server 103. The data access request identifies requested data stored in the data storage device 389 within the cloud storage server 109. The method also includes an operation 409 for copying the requested data from the data storage device 389 within the cloud storage server 109 into the high-speed data storage device 371 within the management server 105. The high-speed data storage device 371 operates at a higher data rate and a lower latency than the data storage device 389 within the cloud storage server 109. In some embodiments, the data storage device 389 within the cloud storage server 109 is HDD, and the high-speed storage device 371 within the management server 105 is an NVMe SSD. The method further includes an operation 411 for using the high-speed data storage device 371 in the management server 105 to respond to the data access request instead of having the cloud storage server 109 respond to the data access request.

In some embodiments, the method includes using a first network storage protocol for bi-directional data communication between the management server 105 and the cloud storage server 109, and using a second network storage protocol for bi-directional data communication between the management server 105 and the cloud gaming server 103, where the second network storage protocol is different from the first network storage protocol. In some embodiments, the second network storage protocol is PCIe.

In some embodiments, the data access request is a request to mount a particular grouping of data. In some embodiments, the particular grouping of data is a data object, a data file, or a data block. In some embodiments, the particular grouping of data is a save data disk image for the video game that includes save data for the user's play of the video game. The method also includes receiving subsequent data access requests at the management server 105, where the subsequent data access requests are issued by the video game executing on the cloud gaming server 103, and where the subsequent data access requests are directed to the particular grouping of data. The method also includes using the high-speed data storage device 371 in the management server 105 to respond to the subsequent data access requests instead of having the cloud storage server 109 respond to the subsequent data access requests.

In some embodiments, a subsequent data access request is either a read API call or a write API call or an unmount API call or a commit API call. In some embodiments, the method includes operating the management server 105 to respond to the write API call by writing data into the particular grouping of data within high-speed storage device 371 within the management server 105. In some embodiments, the method includes operating the management server 105 to respond to the write API call by writing data into both the particular grouping of data within high-speed storage device 371 within the management server 105 and the particular grouping of data in the data storage device 389 within the cloud storage server 109. In some embodiments, the method includes operating the management server 105 to respond to the read API call by reading data from the particular grouping of data within high-speed storage device 371 of the management server 105. In some embodiments, the method includes operating the management server 105 to respond to the unmount and commit API calls by ensuring that all data currently in the particular grouping of data within high-speed storage device 371 within the management server 105 is also currently present in the particular grouping of data in the data storage device 389 within the cloud storage server 109.

In some embodiments, the CPU 365 of the management server 105-1 to 105-X is configured to implement the method of FIG. 4, including any optional and/or ancillary operations associated with the method of FIG. 4. In some embodiments, computer executable program instructions for performing the operations of the method of FIG. 4 are stored in the computer memory 323 of the management server 105-1 to 105-X.

As described herein, access is provided to users to play online video games within the cloud gaming system 100. The access to the cloud gaming system 100 can be provided over a wide geographical area. Cloud computing is a style of computing in which dynamically scalable and often virtualized resources are provided as a service over the Internet. Users do not need to be an expert in the technology infrastructure in the computing "cloud" that supports them. Cloud computing can be divided into different services, such as Infrastructure as a Service (IaaS), Platform as a Service (PaaS), and Software as a Service (SaaS). Cloud computing services often provide common online applications, such as video games, that are accessed from a web browser, while the software and data are stored on server computing systems in the cloud. The term cloud is used as a metaphor for the Internet, based on how the Internet is depicted in computer network diagrams and is an abstraction for the complex infrastructure it conceals.

In some embodiments, an online video game may be executed by a distributed game engine. In these embodiments, the distributed game engine may be executed on a plurality of processing entities, such as the cloud gaming server 103-1 to 103-N, such that each processing entity executes a functional segment of a given game engine on which the online video game runs. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services performed by the game engine may include, for example, messaging, social utilities, audio communication, game play replay functions, help functions, etc. While game engines may sometimes be executed on an operating system virtualized by a hypervisor of a particular server, in other embodiments, the game engine itself is distributed among a plurality of processing entities, each of which may reside on different server units of a data center. In some embodiments, the plurality of processing entities include one or more of a server unit, a virtual machine, and a container, among other types of processing entities, depending on the needs of each game engine segment. For example, if a game engine segment is responsible for camera transformations, that particular game engine segment may be provisioned with a virtual machine associated with a graphics processing unit (GPU), since it will be doing a large number of relatively simple mathematical operations (e.g., matrix transformations). Also, by way of example, other game engine segments that require fewer but more complex operations may be provisioned with a processing entity associated with one or more higher power central processing units (CPUs). In some embodiments, a single cloud gaming server 103-1 can host multiple lightweight games (where weight is with regard to computing resource consumption) for different users. In these embodiments, the cloud gaming server 103-1, including its storage CPU 331 and other components, will be shared. This sharing of the cloud gaming server 103-1 can result in different levels of priority for storage requests and/or load balancing, as the network/PCIe connection will be shared and each user should get a fair amount of time. In some embodiments, the single cloud gaming server 103-1 can host both a lightweight game and a heavier game (where weight is with regard to computing resource consumption).

By distributing the game engine, the game engine is provided with elastic computing properties that are not bound by the capabilities of a physical server unit. Instead, the game engine, when needed, is provisioned with more or fewer compute nodes to meet the demands of the online video game. From the perspective of the online video game and a video game player, the game engine being distributed across multiple compute nodes is indistinguishable from a non-distributed game engine executed on a single processing entity, because a game engine manager or supervisor distributes the workload and integrates the results seamlessly to provide online video game output components for the player.

In some embodiments, users/players access the remote services provided by the cloud gaming system 100 through client devices, such as the local computing system 120, which include a processor, a display, and input/output (I/O) device. In various embodiments, the client device can be a personal computer, a mobile phone, a netbook computer, a tablet computer, a personal digital assistant device, or another type of computing device. In some embodiments, a NIC executing on the cloud gaming server 103-1 to 103-N recognizes the type of client device being used by the client and adjusts the data communication method between the cloud gaming server 103-1 to 103-N and the client device as needed. In some embodiments, client devices use a standard communication method, such as HTML (Hypertext Markup Language) or TCP/IP (Transmission Control Protocol/Internet Protocol) or WebRTC (Web Real-Time Communication), to access the cloud gaming server 103-1 to 103-N over the Internet.

It should be appreciated that a given online video game or gaming application may be developed for a specific platform and a specific associated controller device. However, when such an online video game is made available via cloud gaming system 100 as mentioned herein, the user may be accessing the online video game with a different controller device. For example, a video game might have been developed for a game console and its associated controller, but the user might be accessing a cloud-based version of the video game from a personal computer utilizing a keyboard and mouse. In such a scenario, an input parameter configuration can define a mapping from inputs which can be generated by the user's available controller device (in this case, the keyboard and the mouse) to inputs which are acceptable for execution of the cloud-based version of the video game.

In another example, a user may access the cloud gaming system 100 through a tablet computing device, a touchscreen smartphone, or other touchscreen driven device. In this example, the client device and the controller device are integrated together in the same device, with inputs being provided by way of detected touchscreen inputs/gestures. For such a device, an input parameter configuration may define particular touchscreen inputs corresponding to game inputs for the video game. For example, buttons, a directional pad, and/or other types of input elements might be displayed or overlaid during running of the online video game to indicate locations on the touchscreen that the user can touch to generate a game input. Also, gestures such as swipes in particular directions or specific touch motions may also be detected as game inputs. In some embodiments, a tutorial can be provided to the user indicating how to provide input through the touchscreen for gameplay, e.g., prior to beginning gameplay of the online video game, so as to acclimate the user to the operation of the controls on the touchscreen.

In some embodiments, the client device serves as a connection point for a controller device. More specifically, the controller device communicates through a wireless or wired connection with the client device to transmit inputs from the controller device to the client device. The client device may in turn process these inputs and transmit input data to the cloud gaming server 103-1 to 103-N through the network 123, which may be accessed through a local networking device such as a router. However, in other embodiments, the controller can itself be a networked device having an ability to communicate inputs directly through the network 123 to the cloud gaming server 103-1 to 103-N, without being required to first communicate such inputs through the client device. For example, the controller might connect to a local networking device (such as the aforementioned router) for sending data to and receiving data from the cloud gaming server 103-1 to 103-N. Thus, while the client device may still be required to receive video output from the cloud-based video game and render it on a local display, input latency can be reduced by allowing the controller to send input data directly over the network to the cloud gaming server 103-1 to 103-N, so as to bypass the client device.

In some embodiments, a networked controller and a client device can be configured to send certain types of inputs directly from the controller to the cloud gaming server 103-1 to 103-N, and other types of inputs through the client device to the cloud gaming server 103-1 to 103-N. For example, inputs whose detection does not depend on any additional hardware or processing apart from the controller itself can be sent directly from the controller to the cloud gaming server 103-1 to 103-N through the network 123, so as to bypass the client device. Such inputs may include button inputs, joystick inputs, embedded motion detection inputs (e.g., inputs derived from an accelerometer, a magnetometer, and/or a gyroscope), among other types of inputs. However, inputs that utilize additional hardware or require processing by the client device can be sent from the controller to the client device, and then from the client device to the cloud gaming server 103-1 to 103-N. These inputs may include captured video or captured audio from the game environment that may require processing by the client device before being transmitted to the cloud gaming server 103-1 to 103-N. Additionally, inputs from motion detection hardware of the controller might be processed by the client device in conjunction with captured video to detect the position and motion of the controller, which would subsequently be communicated by the client device to the cloud gaming server 103-1 to 103-N. It should be appreciated that the controller device in accordance with various embodiments may also receive data (e.g., feedback data) from the client device or directly from the cloud gaming server 103-1 to 103-N.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although some method operations may be described in a specific order herein, it should be understood that other housekeeping operations may be performed in between method operations, and/or method operations may be adjusted so that they occur at slightly different times or may be distributed in a system which allows the occurrence of the processing operations at various intervals associated with the processing, as long as the processing of the method operations are performed in a manner that provides for successful implementation of the method.

Some embodiments disclosed herein can be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. In some embodiments, the computer readable medium can include computer readable tangible medium distributed over a network-coupled computer system so that the computer readable code is stored and executed in a distributed fashion.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. A management server for a cloud gaming system, comprising:
   a root complex connected to a data link;
   a data bus connected to the root complex;
   a computer memory connected to the root complex;
   a network interface connected to the data bus; and
   a processor connected to the data bus, the processor configured to direct preloading of data associated with a control path application programming interface (API) call received through the data link before a data-path API call is received for the data through the data link, wherein the data is preloaded by receiving the data through the network interface and by loading the data in the computer memory by way of the root complex and data bus.

2. The management server for the cloud gaming system as recited in claim 1, wherein the control path API call is an open API call.

3. The management server for the cloud gaming system as recited in claim 1, wherein the control path API call is a mount API call.

4. The management server for the cloud gaming system as recited in claim 1, wherein the control path API call is associated with execution of a video game on the cloud gaming system.

5. The management server for the cloud gaming system as recited in claim 4, wherein the processor is configured to execute the control path API call upon receipt of the control path API call, and wherein execution of the control path API call blocks continued execution of the video game until execution of the control path API call is completed.

6. The management server for the cloud gaming system as recited in claim 1, wherein the data is preloaded from a data storage device that operates at a lower data rate than the computer memory.

7. The management server for the cloud gaming system as recited in claim 6, wherein the data storage device is located outside of the management server.

8. The management server for the cloud gaming system as recited in claim 6, wherein the data storage device is a hard disk drive.

9. The management server for the cloud gaming system as recited in claim 1, wherein the computer memory is a non-volatile memory express solid state drive.

10. The management server for the cloud gaming system as recited in claim 1, wherein the computer memory is a random access memory or storage class memory.

11. The management server for the cloud gaming system as recited in claim 1, wherein the root complex includes an input/output memory management unit configured to map device-visible virtual memory addresses to physical memory addresses.

12. The management server for the cloud gaming system as recited in claim 11, wherein the input/output memory management unit is configured to provide the cloud gaming system with direct access to the data preloaded in the computer memory.

13. The management server for the cloud gaming system as recited in claim 1, wherein the data link is a peripheral component interconnect express link.

14. The management server for the cloud gaming system as recited in claim 13, wherein the root complex includes a peripheral component interconnect express port connected to the peripheral component interconnect express link.

15. The management server for the cloud gaming system as recited in claim 13, wherein the peripheral component interconnect express link enables the cloud gaming system to bypass the processor of the management server when accessing the computer memory in the management server.

16. The management server for the cloud gaming system as recited in claim 1, wherein the processor is configured to direct flushing of data from the computer memory through the network interface to a data storage device within a cloud storage system in response to receipt through the data link of either an unmount control path API call or a commit control path API call.

17. The management server for the cloud gaming system as recited in claim 1, wherein the processor is configured to use a first network storage protocol for data communication over of the data link, wherein the processor is configured to use a second network storage protocol for data communication through the network interface, and wherein the second network storage protocol is different than the first network storage protocol.

18. The management server for the cloud gaming system as recited in claim 1, wherein the data that the processor directs to be preloaded is a particular grouping of data.

19. The management server for the cloud gaming system as recited in claim 18, wherein the particular grouping of data is one or more of a data object, a data file, and a data block.

20. The management server for the cloud gaming system as recited in claim 18, wherein the particular grouping of data is a save disk image for a video game executed on the cloud gaming system.

* * * * *